US010692388B1

(12) United States Patent
Kessie et al.

(10) Patent No.: US 10,692,388 B1
(45) Date of Patent: Jun. 23, 2020

(54) GLOBAL ENVIRONMENTAL DATA AND APPLICATION METHODS FOR UNDERSTANDING ENGINE HEALTH AND MAINTENANCE

(71) Applicant: General Electric Company, Schenectady, NY (US)

(72) Inventors: Andrew Scott Kessie, Springboro, OH (US); Michael H. Fisher, Cincinnati, OH (US); Daniel Maggard, Cincinnati, OH (US); Byron Andrew Pritchard, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/220,431

(22) Filed: Dec. 14, 2018

(51) Int. Cl.
*G08G 5/00* (2006.01)
*F01D 21/00* (2006.01)
*B64F 5/60* (2017.01)
*B64F 5/40* (2017.01)
*B64D 45/00* (2006.01)

(52) U.S. Cl.
CPC ........... *G08G 5/0043* (2013.01); *B64D 45/00* (2013.01); *B64F 5/40* (2017.01); *B64F 5/60* (2017.01); *F01D 21/003* (2013.01); *G08G 5/0013* (2013.01); *B64D 2045/0085* (2013.01)

(58) Field of Classification Search
CPC .................................. G01N 15/02; B07B 7/00
USPC ........................................................ 340/945
See application file for complete search history.

(56) References Cited

U.S. PATENT DOCUMENTS

| 7,747,382 | B2 | 6/2010 | Small et al. | |
|---|---|---|---|---|
| 9,269,205 | B1 | 2/2016 | Lamkin et al. | |
| 9,657,639 | B2 | 5/2017 | Dupont | |
| 9,927,356 | B2 | 3/2018 | Skibo | |
| 2007/0048186 | A1* | 3/2007 | Call | B07B 7/00 422/68.1 |
| 2009/0095053 | A1* | 4/2009 | Creek | G01N 15/06 73/28.01 |
| 2012/0297028 | A1 | 11/2012 | Das et al. | |

(Continued)

FOREIGN PATENT DOCUMENTS

WO 2008063238 A2 5/2008

OTHER PUBLICATIONS

European Search Report from EP Appl. No. 19215040.7, dated Mar. 6, 2020, 7 pages.

*Primary Examiner* — Fabricio R Murillo Garcia
(74) *Attorney, Agent, or Firm* — Wood IP LLC (57) ABSTRACT

Provided is an engine health management system and method for determining health of an engine of an aircraft, that includes a data source interface which transmits data from internal and external data sources, a control module that includes a processor and a memory and receives data via the data source interface, creates evaluation methods for evaluating the data received to determine suitable data and storing the suitable data within the memory, and creates a controlled historical airport information repository to process historical data via the processor and generate airport information reports based on the historical data. The system also includes a central computing system communicatively coupled with the control module and the data source interface, which performs data enhancement techniques including linking environmental counts and accumulations with engine data.

23 Claims, 4 Drawing Sheets

(56) References Cited

U.S. PATENT DOCUMENTS

| | | | |
|---|---|---|---|
| 2012/0318051 A1* | 12/2012 | Driscoll | G01N 15/02 73/61.71 |
| 2013/0030718 A1 | 1/2013 | Williams et al. | |
| 2016/0125307 A1 | 5/2016 | Zheng et al. | |
| 2016/0282514 A1 | 9/2016 | Moran et al. | |
| 2017/0076509 A1 | 3/2017 | Scofield | |
| 2017/0124461 A1 | 5/2017 | Li et al. | |
| 2018/0012423 A1* | 1/2018 | Dins | G07C 5/085 |
| 2018/0170575 A1 | 6/2018 | Ziarno | |
| 2019/0017917 A1* | 1/2019 | Mauro | G01T 1/178 |

\* cited by examiner

GLOBAL ENVIRONMENTAL DATA AND APPLICATION METHODS FOR UNDERSTANDING ENGINE HEALTH AND MAINTENANCE

I. TECHNICAL FIELD

The present invention relates generally to a method for identifying and quantifying global environmental data and the application of that data for determining engine health and identifying engine maintenance requirements. In particular, the present invention relates to application methods for quantifying and linking the full global environmental airborne particulate to improve the understanding and prediction of the environmental impact on air breathing engines (e.g. aviation engines).

II. BACKGROUND

Aviation engines typically do not include air filters and therefore airborne environmental aerosols and particulate can have significant multiple negative effects on aviation engines. The varied usage and diverse global operation of aviation engines can result in a wide range in engine hardware life, time in flight and maintenance costs.

It is desirable to have an environmental data and particulate data collection and processing system to efficiently collect, classify, verify and relay data in real-time, near real time, and on-demand, as desired for understanding and predicting the health of the aviation engines.

III. SUMMARY OF THE EMBODIMENTS

The present invention provides an environmental data and processing method and system for understanding and predicting engine health status and maintenance by identifying and quantifying global environmental aerosols and particulate that impact aviation engines and identifying the different issues they can cause to allow for targeted maintenance and hardware designs.

According to one or more embodiments, an engine health management system and method for determining health of an engine of an aircraft, that includes a data source interface which transmits data from internal and external data sources, a control module that includes a processor and a memory and receives data via the data source interface, creates evaluation methods for evaluating the data received to determine suitable data and storing the suitable data within the memory, and creates a controlled historical airport information repository to process historical data via the processor and generate airport information reports based on the historical data. The system also includes a central computing system communicatively coupled with the control module and the data source interface, which performs data enhancement techniques including linking environmental counts and accumulations with engine data.

In another embodiment of the present invention, a method of determining environmental data including particulate data and an effect of global environment on an engine of an aircraft is provided. The method includes retrieving, at a control module via a data source interface, data from internal engine data sources and external data sources related to public health and environmental data, creating and performing, at the control module, evaluation methods for evaluating the data received to determine suitable data and storing the suitable data within the memory, creating, at the control module, a controlled historical airport information repository and processing historical data via a processor of the control module, and generating airport information reports based on the historical data; and performing data enhancement operations, via a central computing system communicatively coupled with the control module and including linking environmental counts and accumulations with engine data.

Another embodiment of the present invention includes various methods for enhancing and sub dividing the environmental data using counting and accumulation methods. When these counts and accumulation methods are combined with multiple environmental thresholds, the invention can more precisely capture engine health and engine maintenance needs. This environmental data can also be counted and accumulated over extended time periods, over various operating locations and/or over the entire flight envelope. In addition, the breadth of airborne environmental data includes unique environmental particulate values at various, multiple distinct elevations above the ground to accommodate the entire flight envelope.

The foregoing has broadly outlined some of the aspects and features of various embodiments, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

The drawings are only for purposes of illustrating preferred embodiments and are not to be construed as limiting the disclosure. Given the following enabling description of the drawings, the novel aspects of the present disclosure should become evident to a person of ordinary skill in the art. This detailed description uses numerical and letter designations to refer to features in the drawings. Like or similar designations in the drawings and description have been used to refer to like or similar parts of embodiments of the invention.

V. DETAILED DESCRIPTION OF THE EMBODIMENTS

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components.

In other instances, well-known components, apparatuses, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

The embodiments of the present invention a system and method for detecting and quantifying global environmental aerosols and particulate that impact aviation and other air breathing engines and identifying the different issues they produce to allow for predictive engine health, targeted engine inspections, planned engine maintenance and updated hardware design. The method includes daily tracking and quantification of the various environmental aerosols and weather data, which when combined with engine data, can be used to predict the current health, remaining life and overhaul scheduling of the aviation engines. Further purpose of illustration, the present invention will be described with respect to an aviation engine, however the present invention is not limited hereto and can be applied to non-aviation applications whereby environmental factors such as dust ice, ice crystals, aerosols, volcanic ash, sand, silt, water vapor, pollution, smoke, sulfur, calcium, silica, sea salt, potassium, VOCs, deicing fluid, rain, snow, hail, wind speed, wind direction and temperature and other environmental parameters can have an adverse effect on the operation of an engine or device.

Figure 1:
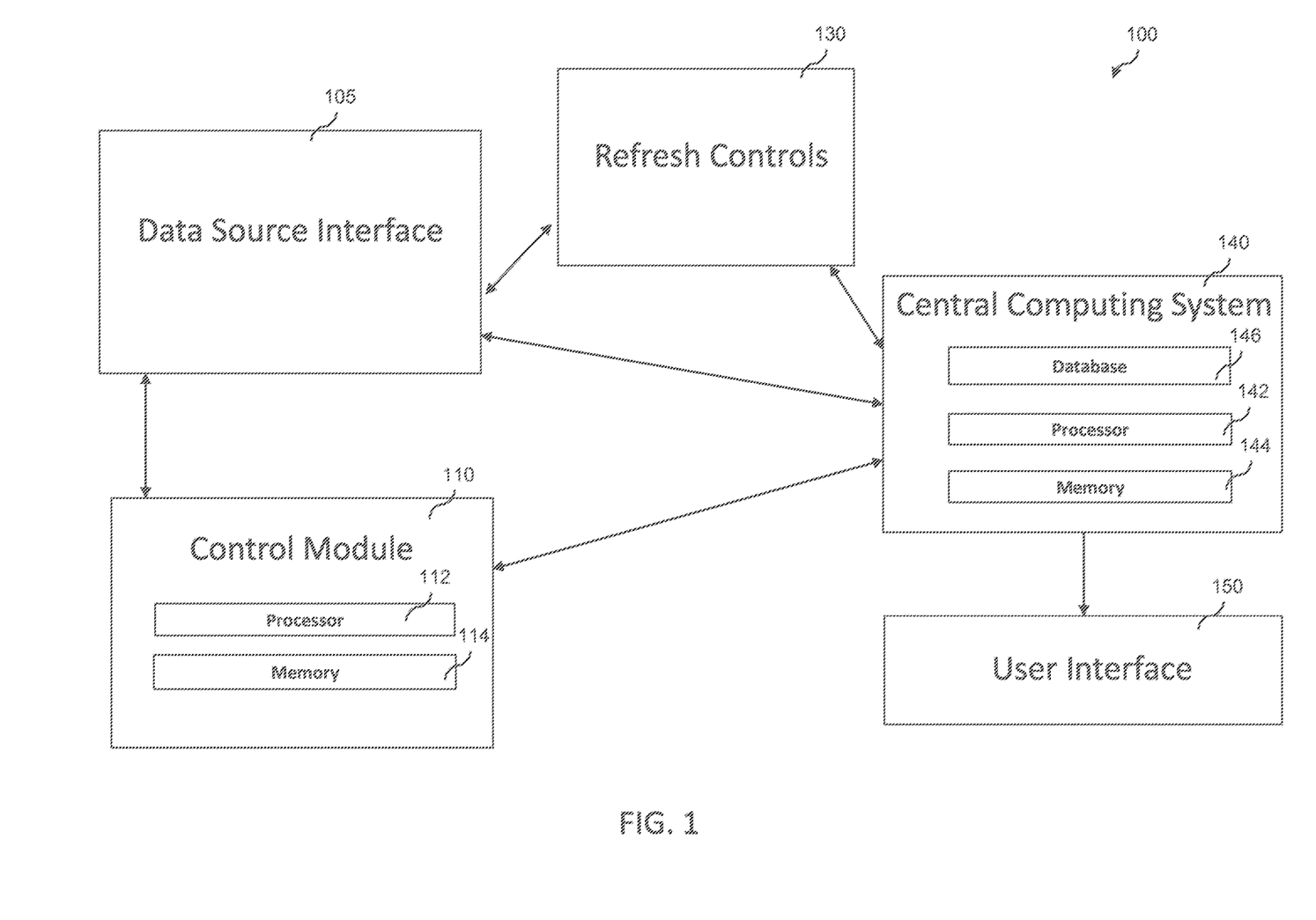
FIG. 1 is a block diagram of an engine health management system that can be implemented within embodiments of the present invention.

According to an embodiment of the present invention, an engine health management system 100 as shown in FIG. 1, is coupled to a plurality of communication links to transfer data to and from an aircraft engine. The communication links can be wired or wireless communication and may be capable of linking with other systems and devices and may include, for example, packet radio, satellite uplink and/or downlink, wireless fidelity (Wifi), WiMax, Bluetooth, Zig-Bee, 3G wireless signal, code division multiple access (CDMA) wireless signal, global system for mobile communication (GSM), 4G wireless signal, long term evolution (LTE) signal, ethernet, or any combination thereof.

The communication links may also include one or more radios including voice, ACARS-analog, ACARS-digital, SATCOM, cellular, etc. The communication links may allow for communication with maintenance personnel via a maintenance vehicle, ground controllers, or directly to a data operation center.

The system 100 includes a data source interface 105, a control module 110, a plurality of refresh controls 130, a central computing system 140, and a user interface 150. The detailed operation of the system 100 will now be described with reference to FIGS. 1 and 2.

Figure 4:
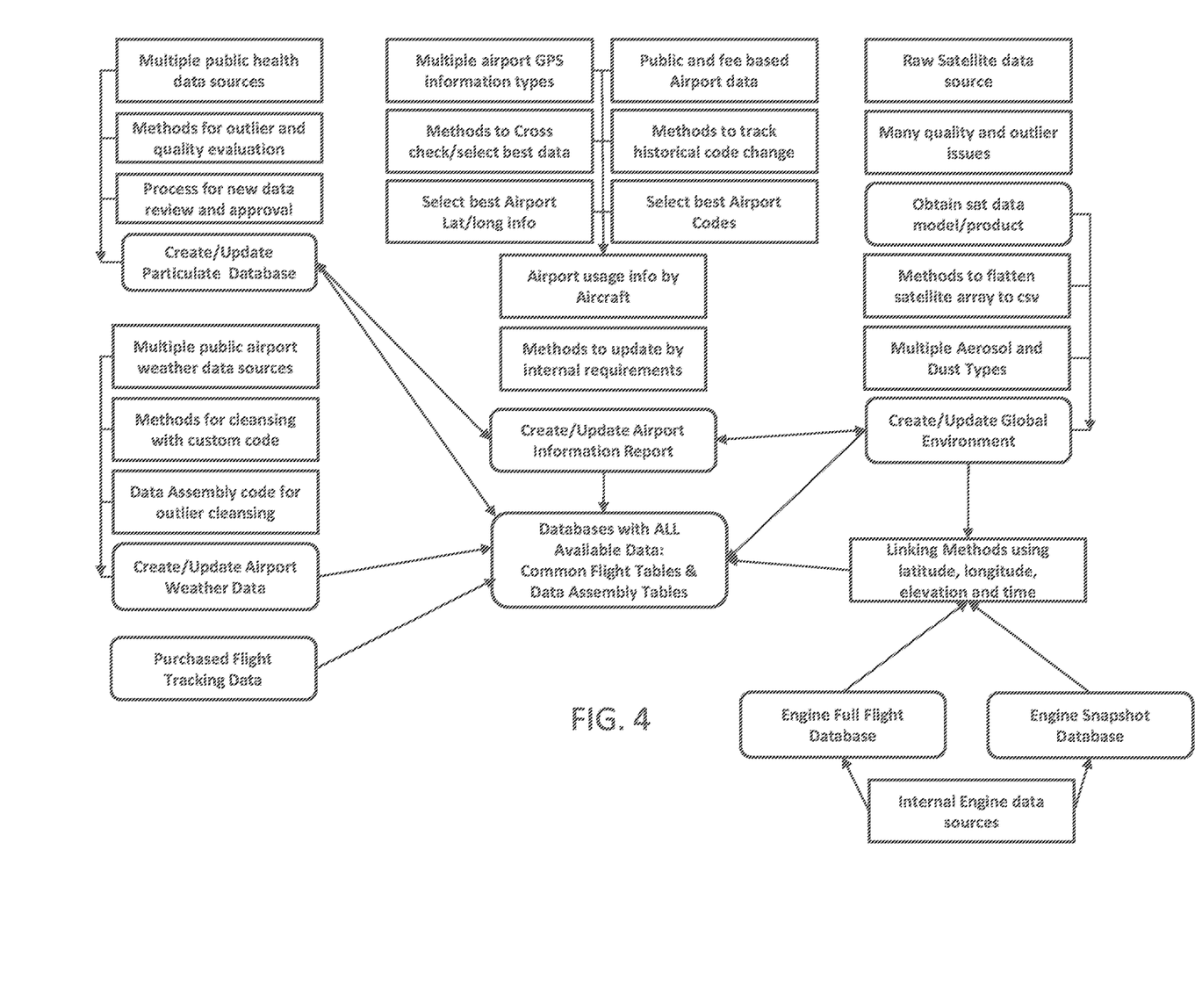
FIG. 4 is a detailed process flow illustrating further specific operations performed by the controller module of the engine health management system, and the types of data to be linked and stored in the database of the engine health management system of FIG. 1 and FIG. 2, that can be implemented within one or more embodiments of the present invention.

The data source interface 105 identifies, collects and verifies various public, private and internal data sources including for example, remote sensing satellites, and ground-based weather stations. Also included are multiple public airport weather data sources, aircraft and engine reports, local health monitoring stations and multiple airport GPS information sources, public and fee-based airport data (as depicted in FIG. 4) and customer information. The data source interface 105 collect the various data sources, evaluates initial data quality and determines data source completeness.

The control module 110 can include at least one processor 112 and at least one memory 114. The control module 110 receives data from the data source interface 105. The processor 112 of the control module 110 develops custom evaluation methods for review of the data received from the data sources to determine the most suitable data combination and linking methods according to embodiments of the present invention. Therefore the most complete, linked and evaluated data is stored within the memory 114 for use within the system and methods of the present invention. For example, any new records are compared to existing records to determine unusual variation, discontinuity or outliers using customized statistical and process control techniques.

The control module 110 further creates a controlled historical airport information repository to process, classify and link previous data via the processor 112 which has been received and stored in memory 114 and generates airport information reports based on the information within the repository. The control module 110 further includes software instructions for performing data quality control processes and data parsing techniques, and outlier evaluation/removal and unit conversions and software instructions to flatten satellite array files and enable linkage to standard data schemes to be stored within memory 114. The data obtained via the data source interface 105 and the control module 110 are linked together at the central computing system 140.

The central computing system 140 includes a processor 142, a memory 144 and a database 146. The processor 142 at the central computing system 140 performs data enhancement techniques which includes methods for connecting various environmental data, including counts and accumulations data enhancement methodologies. The counting operation utilizes an incremental increase (count) for each and every time the engine encounters an environment condition over the predefined threshold level. The accumulation operation captures the difference between the threshold level and the actual environmental level (delta) and adds that amount to the prior accumulation values. The counts and accumulations processes are aggregated and updated at key intervals such as every arrival and departure airport and at every 1° latitude and every 1° longitude. Both the count and accumulation methods can process and evaluate up to 100 different thresholds from 1-100% to determine the optimum threshold related to the distress, maintenance or TOW being evaluated. Similar processing methods exist for rolling averages, standard deviations, trending slopes for selecting the best method to provide the most clarity for the engine analytic application. The software instructions for performing the data enhancement techniques are stored in the memory 144. As indicated by the arrows therebetween the data retrieved via the data source interface 105 and the control module 110, along with all environmental and engine post-processed data are stored in the database 146.

The memory 144 can be a non-volatile memory, non-transitory memory, random access memory (RAM), read-only memory (ROM), flash memory, or one or more different types of memory of the database 146 also includes the various environmental information and accessible by the control module 110 or the processor 112 thereof. The particulate information can include parameters related to, for example, different types of environmental aerosols or particulate, compositions, ratios, concentrations, averages and/or their relationship to other data parameters as detailed in FIGS. 3 and 4. The different types of environmental aerosols or particulates can include for example, dust, ice/ice crystals, aerosols, volcanic ash, sand, silt, water vapor, pollution, smoke, sulfur, calcium, silica, sea salt, potassium, volatile organic compounds (VOCs), deicing fluid, rain, snow and hail. The different types of environmental aerosols or particulates can vary based on wind speed, wind direction or temperature or a combination thereof.

The central computing system 140 can be remotely located for example, within a data operations center. The central computing system 140 is communicatively coupled with the refresh controls 130 and the user interface 150. The refresh controls 130 provides hourly, daily, monthly and yearly updates of the data retrieved from the data source interface 105 and updates the data to be stored in memory 144 at the central computing system 140.

At the user interface 150, evaluations are performed on past environmental trends to predict future environmental and weather issues to thereby improve inspection intervals and prevent unplanned engine removal. Further, detailed insight into various hardware and engine issues from daily levels of different environmental data provides targeted maintenance actions (e.g., water wash or on-wing maintenance of an aircraft) based on the known engine and hardware configuration also in the data to be stored in memory 144 at the central computing system 140. Based on the methods performed at the control module 110 and the central computing system 140, monthly variations, seasonal trends and yearly averages of the effect of the environmental issues can also be provided to a user at interface 150.

According to embodiments of the present invention, methods and computer program products may also be provided, on any machine-readable media for accomplishing operations of thereof. They can be implemented on existing processors or special purpose processors.

Embodiments of the present invention can include a computer program product comprising machine readable media for carrying or having machine executable instructions or data structures stored thereon. The machine-readable media may be any available media which may be accessed by a general purpose or special purpose computer or other machine with a processor.

Embodiments may be practiced in a network environment such as a local area network (LAN) and a wide area network (WAN) or other type of network.

Figure 2:
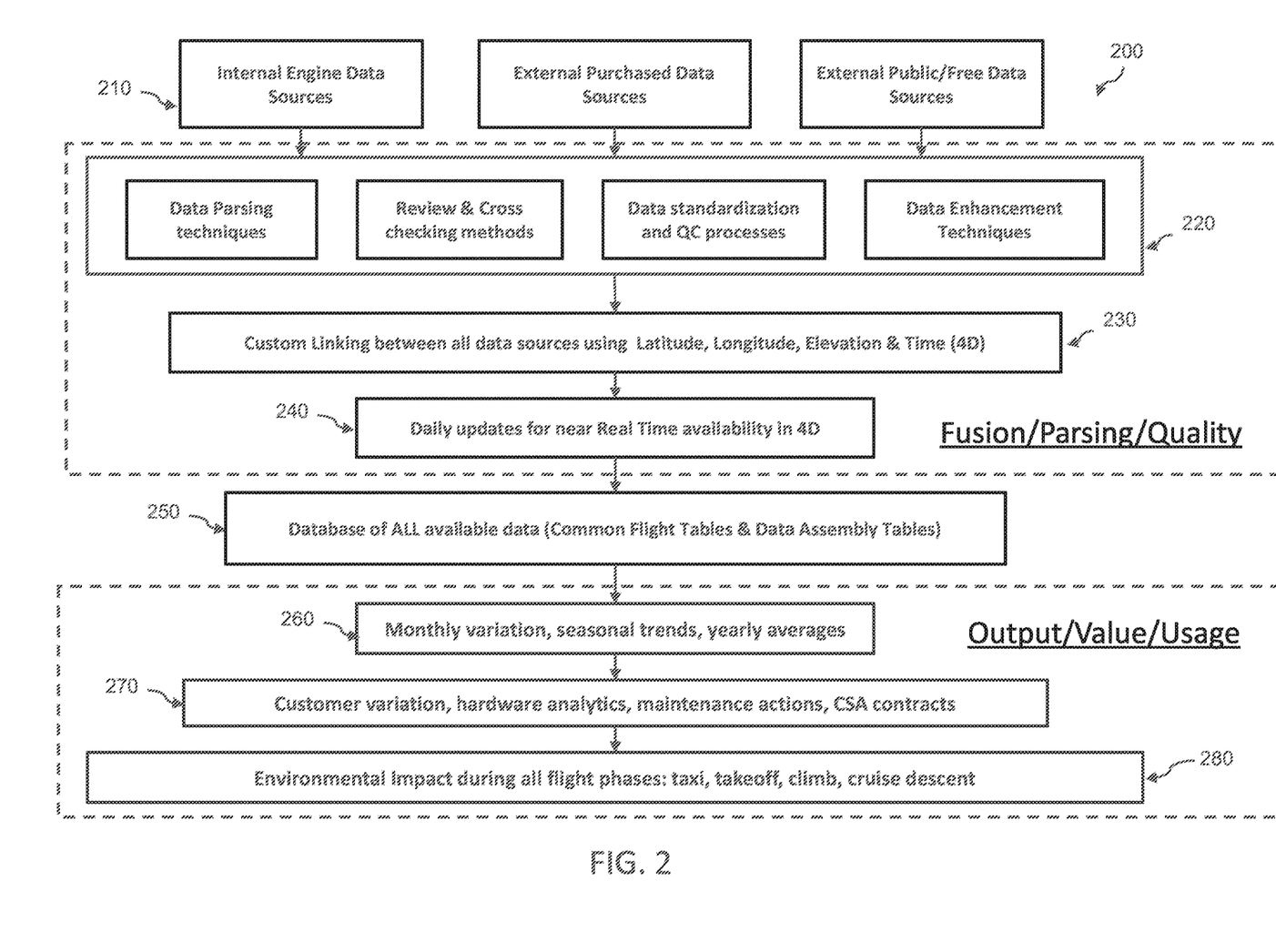
FIG. 2 is a data and process flow illustrating a method of determining various types of environmental data including weather and particulate data and their effect on aviation engines, that can be implemented within one or more alternative embodiments of the present invention.

As shown in FIG. 2, a method 200 of determining environmental and weather data and the effect on the aviation engines using the engine health management system 100 shown in FIG. 1 is provided.

The method 200 starts at operation 210 where data is transmitted from internal engine data sources, external purchased data sources, and external public data sources into the engine health management system 100 via the data source interface 105 (as depicted in FIG. 1). The method 200 then moves to operation 220.

At operation 220, the data parsing techniques, review and cross-checking methods, data standardization and quality control processes; and Data enhancement techniques including counts and accumulations data enhancement operations are performed at the control module 110 and the central computing system 140, respectively. Additionally, at operation 220, the data parsing is performed by selecting the applicable airborne environmental and particulate data for the various types and quantities as discussed below with reference to FIG. 3. The different environmental types can be any of the above-mentioned aerosols or particulates or weather factors.

Figure 3:
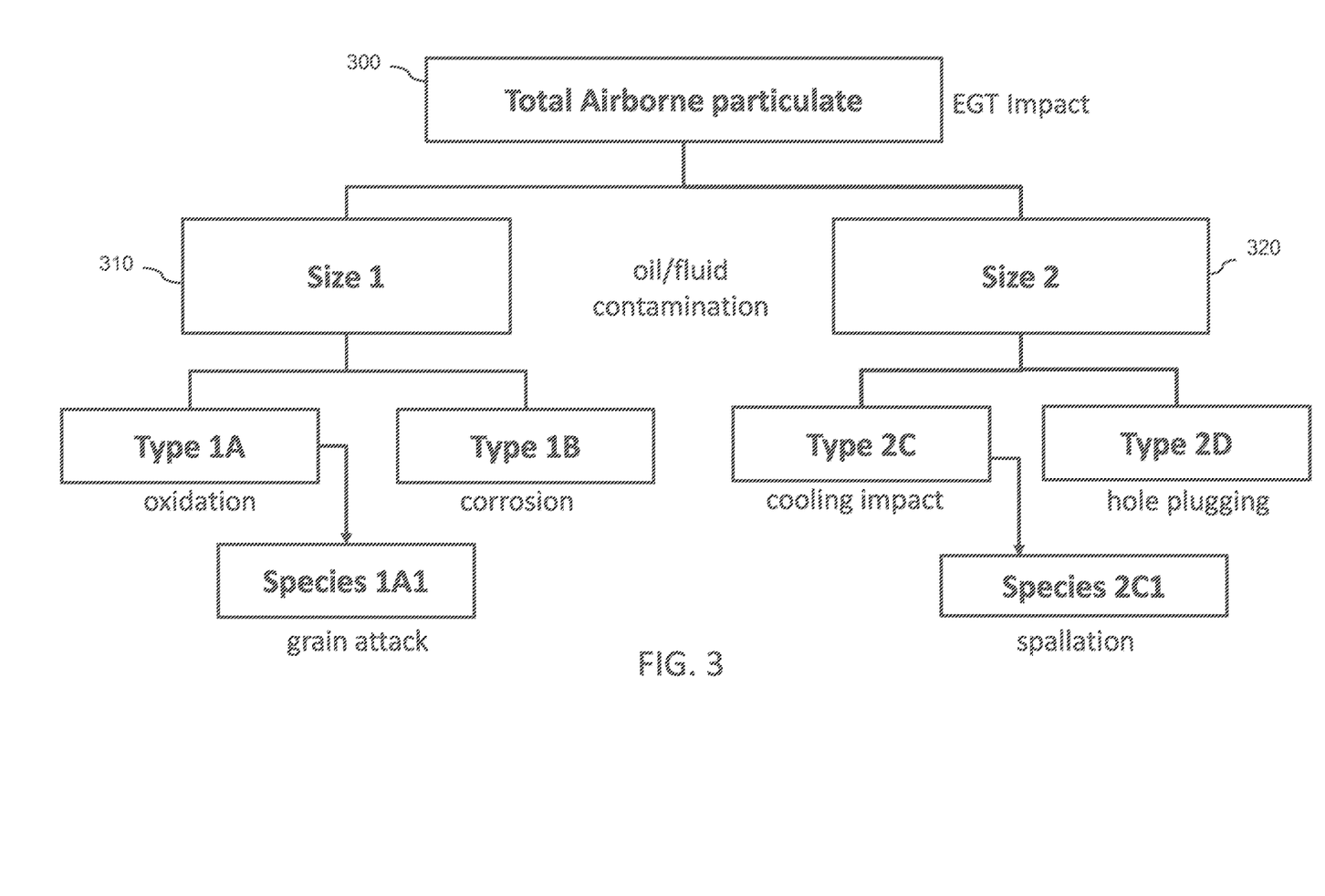
FIG. 3 is a block diagram illustrating multiple environmental data sub-dividing and various particulate and associated distress classification operations included in the process flow shown in FIG. 2, that can be implemented or linked within one or more alternative embodiments of the present invention.

In FIG. 3, the total airborne particulate 300 is divided into at least two groups based on the different sizes and types of particulate. The particulate size can depend upon global location and can vary continuously. At 310, the particulate is of a first size (size 1) and at 320, the particulate is of a second size (size 2) which is greater than that of the first size (size 1). According to embodiments of the present invention, the first size (size 1) is of a fine particulate less than approximately 1 micron ($\mu$m) while the second size (size 2) is of a coarse particulate greater than approximately 1-2 microns ($\mu$m). The present invention is not limited hereto, and may vary as necessary.

From 310, the particulate is then further divided into at least two different classification types, type 1A which causes an oxidation type of hardware distress and a type 1B which causes a corrosion type of hardware distress. The type 1A particulate can further be broken down into a sub-species 1A1 that can cause an intergranular grain attack hardware distress.

From 320, the particulate of size 2 is then split into at least two types, type 2C and type 2D. Type 2C is known to deposit on internal cooling surfaces thereby reducing cooling effectiveness and increasing metal temperatures and distress. Type 2D is known to infiltrate cooling circuits and plug or restrict small cooling holes thereby increasing metal temperatures and distress. The type 2C can further be broken down into a spallation type sub-species, species 2C1 that can infiltrate thermal barrier coatings causing coating spallation and degradation and higher metal temperatures. Any of these types can be potentially correlated as the root cause or the most likely environmental factor for engine hardware distress.

All of the various environmental information stated above can be retrieved in real-time or near real time in order perform necessary inspection or preventative maintenance based on combined assessment with other historical data retrieved from previous data stored and evaluation methods performed.

Referring back to FIG. 2, at operation 220, the cross-checking of data performed at the control module 110 allows for selection of the most accurate and useful data (as depicted in FIG. 1 via user interface 150). In addition, several methods are available for tracking historical airport code changes, selecting the most accurate airport latitude and longitude information and airport usage information, from the data sources. Based on this information, internal customized methods are performed to adapt to new data or data provided in a different format or data available in a newer version.

In addition, data received from the public health data sources, for example, can undergo quality evaluation and a review and approval process via the control module 110. The satellite data retrieved can also undergo quality evaluation and parsing methods to flatten satellite array data to a more user friendly format and allow linking to other data of this invention. From the various environmental and weather data sources, the data may undergo a cleaning process with specific software instructions as performed by the processor 112 (as depicted in FIG. 1). The processed and cleansed data is then used to create or update the overall environmental database.

Several additional databases can be created and linked including a purchased flight tracking database, an airport information database, reports related to the global environ- 
ment, engine full flight database and engine snapshot database from the internal engine data sources.

Referring back to FIG. 2, operation 230 includes performing operations to correctly link the various data sources described above at the central computing system 140.

The process continues to operation 240 where daily updates are performed in real-time or near-real time via the refresh controls 130 as depicted in FIG. 1. All of the data obtained is then stored in the database 146 at the central computing system 140 (at operation 250). The database 146 (as depicted in FIG. 1) can include engine flight data tables and environmental data tables and other associated weather data.

At operation 260, data is then analyzed and outputted in the form of monthly variations, seasonal trends, yearly averages at the user interface 150. At operation 270, improvements and modifications are made using the customer variation, hardware analytics, and maintenance actions. In operation 380, environmental impact during all flight phases including taxi, takeoff, climb and cruise descent can be determined and linked with all previous data.

The method further includes, at operations 260, 270, and 280, creation of multiple environmental trigger thresholds. These trigger thresholds are determined from data sets calculations using coded techniques, to identify counting methods using events at above and below each calculated trigger threshold. Additional factors for the trigger thresholds include the determination of environmental accumulation methods using environmental values above and below each trigger threshold. These counts and accumulations are performed on all the various aerosol species that may impact engine hardware distress in order to track and predict inspections, maintenance and removals. The multiple aerosol sub-species types are review simultaneously to identify the most likely root cause drivers and facilitate necessary redesign and maintenance or inspection actions.

Software instructions to perform the above-identified methods and operations can be stored in the database 146 and the memory 114 of the control module 110 (as depicted in FIG. 1). By way of example and not limitation, the processor 112 is configured to retrieve the software instructions and perform the above-identified methods. The processor 112 can also perform additional methods and operations suitable for the purposes set forth herein.

As shown in FIG. 4, the engine health management system 100 (of FIG. 1) further links all of the databases together. This linking can be facilitated by creating the common flight tables and data assembly tables in the database (e.g., database 146). The health management system 100 can also update airport information reports using linking methods based on latitude, longitude, elevation and date/time information. For example, each and every flight record from an individual engine can be linked with all the various environmental and weather data over the entire history to be readily available for users via the user interface 150

Embodiments of the present invention provides the advantages of determining and quantifying multiple aerosol types for understanding specific root cause drivers, obtaining daily updates providing real-time and near real-time engine/hardware tracking, and yearly/seasonal trending allowing service contract forecasting. The embodiments also provide for tracking of extreme weather events for determining immediate maintenance needs/faults, providing airport information creating direct linkage to arrival/departure. Additional features provided by the embodiments include the use of the environmental values at various elevations within the atmosphere to provide linkage over full flight path(s) of aircrafts.

This written description uses examples to disclose the invention including the best mode, and also to enable any person skilled in the art to practice the invention, including making and using any devices or apparatuses and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An engine health management system for determining health of an engine of an aircraft, the engine health management system comprising:

a data source interface configured to transmit data from internal and external data sources including environmental and weather data sources;

a control module comprising at least one processor and a memory and configured to:

(i) receive data via the data source interface, (ii) perform data parsing operations comprising selecting airborne environmental and particulate data received via the data source interface from the environmental and weather data sources, (iii) create evaluation methods for evaluating the data received to determine suitable data combinations and linking methods for obtaining and storing of linked and evaluated data within the memory, wherein any new data is evaluated, accumulated and/or enhanced and added to the historical data, (iv) create a controlled historical airport information repository to process, classify and link the historical data stored in the memory via the at least one processor and generate airport information reports based information within the controlled historical airport information repository; and a central computing system communicatively coupled with the control module and the data source interface, and comprising at least one processor, a memory and a database, and configured to: (i) link together the data obtained from the data source interface and the control module, and (ii) perform data enhancement techniques including linking environmental counts and accumulations with engine data.

2. The engine health management system of claim 1 wherein the at least one processor of the control module is further configured to:

perform data parsing techniques, cross-checking methods and quality control operations on the data received.

3. The engine health management system of claim 2, the at least one processor of the control module is further configured to:

quantify global airborne aerosols and particulate; and divide a total of the global airborne aerosols and particulate quantified, into separate groups based on particulate size and type to determine cause and effect on engine hardware and entire engine of the aircraft.

4. The engine health management system of claim 3, wherein the total of the global airborne aerosols and particulate is divided into at least two particulate groups wherein a first particulate group is of a first size and a second particulate group is of a second size greater than that first size.

5. The engine health management system of claim 4, wherein the first size is of a fine particulate less than approximately 1 micron (μm) while the second size is of a coarse particulate greater than approximately 1 micron (μm)-2 microns (μm).

6. The engine health management system of claim 4, wherein the global airborne aerosols and particulate in the first particulate group is split into at least two different types of particulate, wherein the central computing system provides hardware root cause distress drivers associated with each different size and type including exhaust gas temperature (EGT) increase, cooling impact, contamination, oxidation, corrosion, spallation, hole plugging and a grain attack.

7. The engine health management system of claim 1, wherein the internal and external data sources comprises multiple health data sources, multiple airport weather data sources, engine data sources, airport global positioning system information sources, public and fee-based airport data, and satellite data sources.

8. The engine health management system of claim 1, wherein the historical data comprises global environment factors on the aircraft including one of dust, ice, aerosols, particulate, ice crystals, volcanic ash, sand, silt, water vapor, pollution, smoke, sulfur, calcium, silica, sea salt, potassium, VOCs, deicing fluid, rain, snow, hail, wind speed, wind direction or temperature.

9. The engine health management system of claim 8, wherein the central computing system is further configured to link environmental counts and accumulations with engine data by:
   counting an incremental increase for each time the engine encounters an environmental condition over a predefined threshold level; and
   determining a difference between the predefined threshold level and an actual environmental level and adding the difference to prior accumulation values.

10. The engine health management system of claim 9, wherein the at least one processor of the central computing system is further configured to:
   adjust flight operations and provide periodic updates in real-time regarding the global airborne aerosols and particulate based on environmental counts and accumulations linked with the engine data and an effect of the global environment a factors as determined.

11. The engine health management system of claim 10, further comprising a user interface communicatively coupled to the central computing system and configured to:
   perform evaluations on past environmental trends to predict future environmental issues;
   provide detailed information regarding hardware and engine issues from daily levels of different global aerosol types;
   determine maintenance actions to be performed based on the hardware and engine issues.

12. The engine health management system of claim 11, further comprising a plurality of refresh controls for providing hourly, daily and yearly data updates, wherein the central computing system is further configured to receive the hourly, daily and yearly updates and stored within the database of the central computing system.

13. A method of determining environmental data including particulate data and an effect of global environment on an engine of an aircraft, the method comprising:
   retrieving, at a control module via a data source interface, data related to public health and environmental data from internal and external data sources including environmental and weather data sources;
   performing data parsing operations comprising selecting airborne environmental and particulate data received via the data source interface from the environmental and weather data sources;
   creating and performing, at the control module, evaluation methods for evaluating the data received to determine suitable data combinations and linking methods for obtaining and storing of the linked and evaluated data within a memory of the control module, and evaluating, accumulating and/or enhancing and adding any new data to the historical data;
   creating, at the control module, a controlled historical airport information repository and processing, classifying and linking the historical data stored in the memory via at least one processor of the control module, and generating airport information reports based on information within the controlled historical airport information repository;
   performing data linking and data enhancement operations, via a central computing system communicatively coupled with the control module and including linking together the data obtained from the data source interface and the control module, and performing data enhancement techniques including linking environmental counts and accumulations with engine data; and
   performing linking operations on the internal and external data sources using latitude, longitude, date, time and other techniques.

14. The method of claim 13, further comprising:
performing via the at least one processor, data parsing techniques, cross-checking methods and quality control operations on the data retrieved.

15. The method of claim 13, further comprising:
identifying and classifying airborne particulate;
dividing, by the processor, a total of the airborne particulate, into separate particulate groups based on particulate size and type to determine the effect on the engine of the aircraft; and
determining the effect of the global environment on the aircraft health on the engine of the aircraft and maintenance actions to be performed.

16. The method of claim 15, further comprising dividing the total of the airborne particulate into at least two particulate groups wherein a first particulate group is of a first size and a second particulate group is of a second size greater than that first size.

17. The method of claim 16, wherein the first size is of a fine particulate less than approximately 1 micron (μm) while the second size is of a coarse particulate greater than approximately 1 micron (μm)-2 microns (μm).

18. The method of claim 16, further comprising splitting the total of the airborne particulate into at least two different types of particulate, wherein the central computing system provides hardware root cause distress drivers associated with each different size and type including exhaust gas temperature (EGT) increase, contamination, cooling impact, oxidation, corrosion, spallation hole plugging and a grain attack.

19. The method of claim 18, further comprising determining whether a subspecies of the at least two different types of particulate correlates to a root cause of issues associated with the engine of the aircraft.

20. The method of claim 19, wherein linking the environmental counts and accumulations with engine data via the central computing system further comprises:
- counting an incremental increase for each time the engine encounters an environmental condition over a predefined threshold level; and
- determining a difference between the predefined threshold level and an actual environmental level, and adding the difference as determined to prior accumulation values.

21. The method of claim 20, further comprising linking and tracking environmental data over an entire full flight path by quantification of environment aerosols and particulate at different elevations within the atmosphere.

22. The method of claim 13, further comprising storing historical data associated with the airborne environmental and particulate data and the effect of global environment on the engine of the aircraft.

23. The method of claim 13, further comprising adjusting flight maintenance and operations and providing periodic updates in real-time regarding the particulate data based on the environmental counts and accumulations linked with the engine data and the effect of the global environment on the engine of the aircraft.

\* \* \* \* \*